Sept. 24, 1935.  J. J. ROSEN  2,015,288
MOISTURE CONDENSER FOR COMPRESSED AIR
Original Filed Feb. 24, 1931
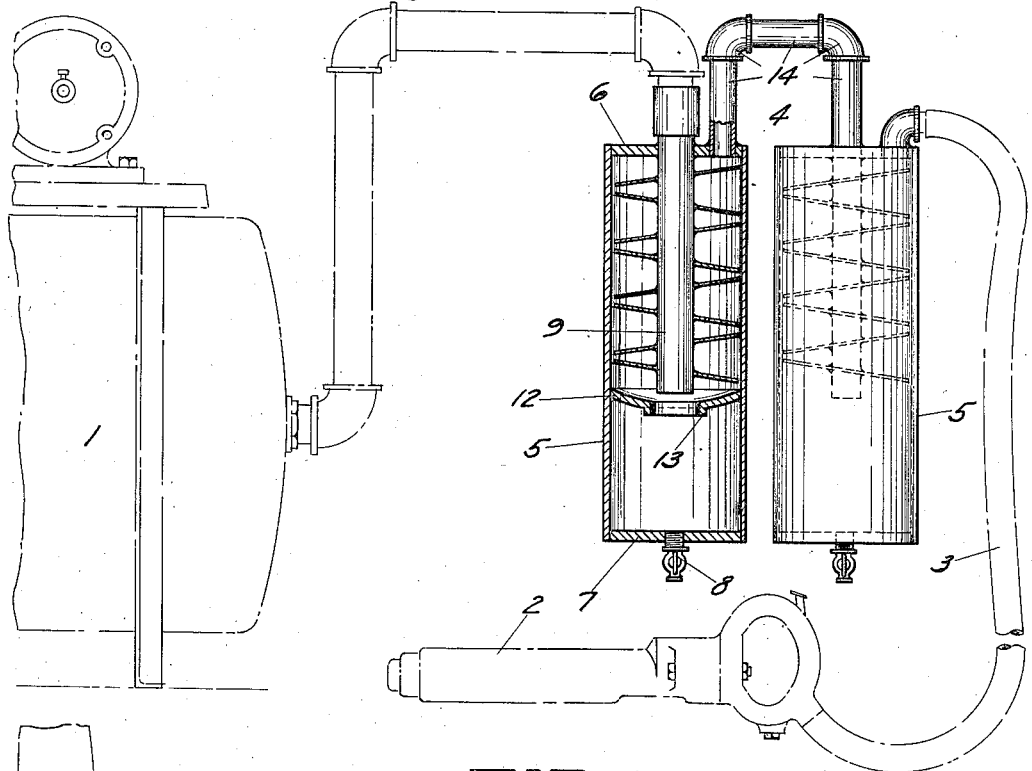
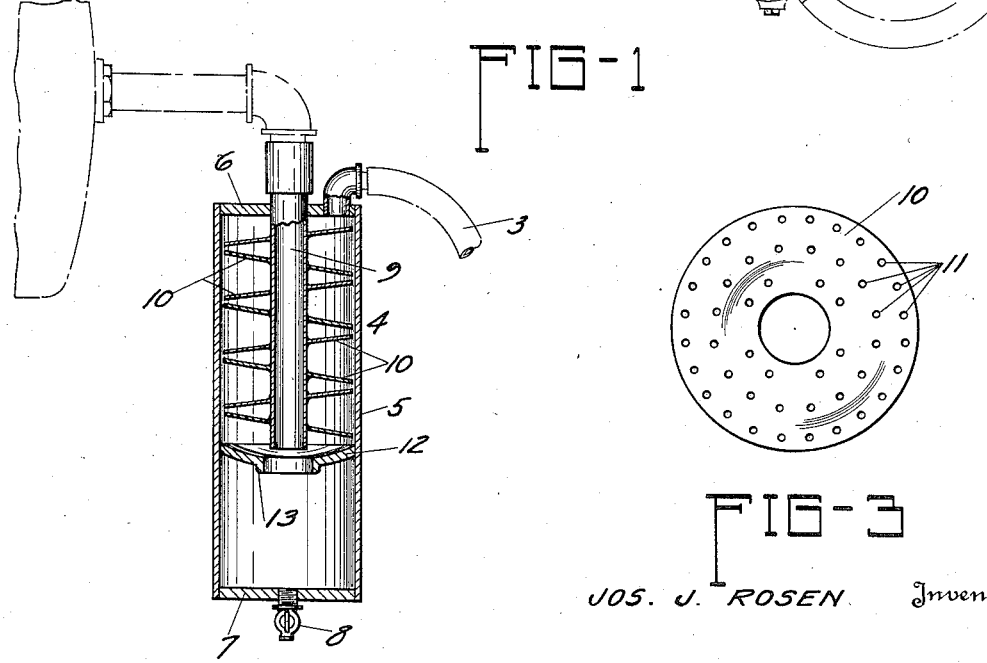
JOS. J. ROSEN  Inventor
By Merrill M. Blackburn.
Attorney Patented Sept. 24, 1935

2,015,288

UNITED STATES PATENT OFFICE 2,015,288

MOISTURE CONDENSER FOR COMPRESSED AIR

Joseph J. Rosen, Davenport, Iowa

Substitute for application Serial No. 517,906, February 24, 1931. This application July 15, 1935, Serial No. 31,448

4 Claims. (Cl. 257—29)

The present invention relates to mechanism for removing the water from the compressed air used in connection with air hammers, which are driven by compressed air, and includes among the objects thereof to provide a means for taking out of the air enough moisture so that the operation of the air hammer will not be interfered with by the presence of water in the hammer; to provide an improved mechanism for the accomplishment of the purpose stated; to provide in the air line of an air hammer mechanism for trapping moisture carried along by the air and collecting the same before the air is delivered to the hammer; to provide a means for the purpose indicated which will have means whereby the collected moisture may be withdrawn from time to time as may be necessary; and such further objects, advantages, and capabilities as will hereafter appear and as are inherent in the construction disclosed herein. My invention further resides in the combination, construction, and arrangement of parts illustrated in the accompanying drawing and, while I have shown therein what is now considered the preferred embodiment of this invention, I desire the same to be understood as illustrative only and not to be construed in a limiting sense.

In the drawing annexed hereto and forming a part hereof,

Fig. 1 shows my improved device in elevation and in longitudinal section, in association with a source of compressed air and with an air hammer;

Fig. 2 shows a longitudinal section of a single device of the type shown in Fig. 1 which has been found to be quite effective for the purpose for which this device is intended;

Fig. 3 shows a plan view of one of a series of plates used as a condensing means for the moisture of the air passing through the device.

Referring more in detail to the annexed drawing, a source of compressed air is denoted generally by the numeral 1 and is shown in dotted outline while the air hammer 2 and its pipe 3 connecting it to the moisture trap are likewise shown in dotted lines. My improved trap 4 comprises one or more tubular members 5 provided with closure elements 6 and 7 which close the ends of the tubular members. As disclosed in my prior application Serial No. 438,095, filed March 22, 1930, these closure members consisted of caps which were either connected to the tubular members 5 by screw threading or were brazed or otherwise attached thereto. I have found that it is simpler and less expensive to cut out discs to be adjusted inside of the members 5 and then weld or braze these in place, as illustrated in Figs. 1 and 2. All that is necessary is that these closure members shall be secured in air-tight relation to the members 5 so that there shall be no leakage of the compressed air from the condensing chambers. The bottom closures or caps 7 are provided with drain cocks 8 by means of which moisture collected in the lower end of the device may be drawn off, as necessary. Leading into the interior of the trap, preferably through the upper closure member 6, is a tube 9 which extends downwardly some distance, being illustrated in the drawing as extending about two-thirds way towards the bottom of the trap. Mounted upon the pipe 9 are plates 10 which are provided with openings 11 through which the air may pass on its way from the tank 1 to the air hammer 2. These openings are illustrated as being circular in form, but it will be understood that no particular shape is necessary as slots of various forms or other shaped figures might be used in place of the circular openings 11 illustrated in Fig. 3. It should perhaps be commented that the plates or discs 10 are preferably rigidly secured to the pipe 9 for ease in assembly and that when assembled in the tubular member 5 they are spaced slightly away from said member, throughout the entire interior thereof, thus permitting the air to pass upwardly between the edges of the plates and the wall of the tubular member 5.

As illustrated in Figs 1 and 2, an upwardly concave baffle 12 may be mounted in the tubular member 5 at a point slightly below where the end of tube 9 will be. This member is provided around its contral opening with a downwardly extending flange 13 which assists in forming a trap below member 12 to prevent water collecting in the bottom of this chamber from being blown upwardly by the air rushing through the pipe 9 and striking the surface of the collected water. This water condenses on the baffle plates 10 and runs down to the member 12 and toward the center thereof to be discharged through the opening therein into the lower part of the tubular member.

As indicated in Fig. 1, this trap 4 may comprise a pair of tubular members 5, which may be either identical or dissimilar. In this figure, one of these members is shown as being provided with the baffle 12 while the other one is shown as being without this. The construction illustrated in my prior application, Serial Number 438,095, above identified, was not provided with any member 12 and the two trap members were identical. It has been found in actual practice that the addition of member 12 makes it practically unnecessary to use two trap members in series, as the structure shown in Fig. 2 is sufficient to remove the larger part of the moisture from the air being delivered by the compression tank. While the construction illustrated in Fig. 2 is believed to be entirely adequate for the removal of the moisture contained in the air, I do not wish to be limited to the use of a single trap member and, therefore, have illustrated in Fig. 1 the use of two of them. A system of piping 14 connects the top of the first member to the lower part of the second member, thus insuring that the air delivered from the first member to the second one will pass upwardly through and around the baffle plates 10. Whenever it is thought desirable to remove the water collected in the trap, this may be done by opening the cock 8 and permitting the air delivered under pressure from the tank 1 to blow the moisture out. It will be appreciated that this will happen very quickly under such a pressure as is used in operating air hammers.

While I have disclosed my invention as being used in connection with an air hammer, I desire it understood that it may have other uses also and therefore that it is not to be construed as being limited in its utility to the use disclosed. It is of course understood that the specific description of structure set forth above may be departed from without departing from the spirit of my invention as set forth in this specification and the appended claims.

This application is a substitute for my abandoned application Serial Number 517,906 filed Feb. 24, 1931.

Having now disclosed my invention, I claim:

1. In a structure of the general nature indicated for use in combination with a compressed air reservoir and an air hammer, a tubular member having an air admission pipe extending through one end thereof and delivering compressed air from the reservoir to the other end of the tubular member, a pipe leading from the end of the tubular member opposite that to which the compressed air is delivered, said pipe extending into another tubular member and carrying air from the first member to the second one, a pipe carrying air from a part of the second tubular member which is remote from the point of delivery of air thereto, and baffle means within said tubular members and mounted therein so that the air may circulate between the edges of the baffles and the interior walls of the tubular members, said baffles having perforations therethrough for the passage of air in its course of travel from the tank to the air hammer, and means for withdrawing from the tubular members any water condenser therein.

2. A device of the character described for use in combination with a source of supply of air under pressure and a means for utilizing said compressed air, said device including a tubular member having baffle plates mounted therein, means for admitting compressed air to one end of the tubular member, means for withdrawing said compressed air from the opposite end of said member, after the air has passed through and around said plates, and a guard plate mounted in said tubular member beyond the baffle plates and having an aperture therethrough in alignment with the means carrying the compressed air from the source thereof into said member.

3. A structure for the purpose indicated comprising a tubular member having its ends closed against the escape of air therefrom, a guard mounted in said container between its middle and one end, a tubular member leading into said first named tubular member and having its discharge end in the vicinity of the guard plate, said guard plate having an aperture therethrough in substantial alignment with the second mentioned tubular member, said guard plate having a flange around its aperture directed away from the second mentioned tubular member, means for connecting said second mentioned tubular member with a source of supply of compressed air, and means for withdrawing compressed air from said device and carrying same to a point where it may be utilized.

4. A structure for the purpose indicated comprising a tubular member having end closures therefor, one of said end closures having a pipe extending therethrough and to the vicinity of the middle of said tubular member, baffle plates mounted upon said pipe, secured thereto, and spaced from said tubular member a distance such that the assembled pipe and baffle plates may be inserted into said tubular member freely, means for delivering compressed air into said pipe, means for withdrawing compressed air from said tubular member, and means at the opposite end of the tubular member from the withdrawing means for removing water collected in said tubular member.

JOSEPH J. ROSEN.